US008753069B2

(12) United States Patent
Maier

(10) Patent No.: US 8,753,069 B2
(45) Date of Patent: Jun. 17, 2014

(54) EDDY CURRENT DAMPER AND METHOD

(75) Inventor: Martin D. Maier, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/522,431

(22) PCT Filed: Jul. 30, 2011

(86) PCT No.: PCT/US2011/046045
§ 371 (c)(1),
(2), (4) Date: Aug. 15, 2012

(87) PCT Pub. No.: WO2012/030459
PCT Pub. Date: Mar. 8, 2012

(65) Prior Publication Data
US 2012/0321439 A1 Dec. 20, 2012

Related U.S. Application Data

(60) Provisional application No. 61/378,169, filed on Aug. 30, 2010.

(51) Int. Cl.
*F01D 3/00* (2006.01)
*F01D 25/16* (2006.01)
*F16C 32/04* (2006.01)

(52) U.S. Cl.
CPC *F01D 3/00* (2013.01); *F01D 25/16* (2013.01); *F16C 32/0442* (2013.01); *F05D 2240/515* (2013.01)
USPC .......................................... 415/104; 415/229

(58) Field of Classification Search
USPC ....... 415/229, 104; 416/244 R, 174; 318/611, 318/612
See application file for complete search history.

(56) References Cited

U.S. PATENT DOCUMENTS

| 4,517,505 | A | * | 5/1985 | Cunningham | ................ 318/611 |
| 5,104,284 | A | | 4/1992 | Hustak, Jr. | |
| 6,255,752 | B1 | * | 7/2001 | Werner | ........................ 310/90.5 |
| 2009/0295244 | A1 | | 12/2009 | Ries | |

FOREIGN PATENT DOCUMENTS

| JP | 02096016 | 7/1990 |
| JP | 10502722 | 3/1998 |
| JP | 2007162726 | 6/2007 |
| WO | 2012030459 | 3/2012 |

OTHER PUBLICATIONS

International Application No. PCT/US2011/046045—Notification of International Search Report and Written Opinion mailed Feb. 17, 2012.

* cited by examiner

*Primary Examiner* — Dwayne J White
(74) *Attorney, Agent, or Firm* — Edmonds & Nolte, PC

(57) ABSTRACT

An apparatus for supporting a shaft of a turbomachine. The apparatus may include a magnetic bearing to support the shaft during a normal operation of the turbomachine, and an auxiliary bearing to support the shaft during a drop event. The apparatus may also include a disk coupled to the shaft and comprising a substantially non-ferrous, conductive material, and a magnetic assembly disposed proximal the disk, the magnetic assembly configured to magnetically engage the disk to damp vibrations during the drop event, to apply a circumferential braking force on the disk during the drop event, or both.

16 Claims, 7 Drawing Sheets

US 8,753,069 B2

EDDY CURRENT DAMPER AND METHOD

CROSS REFERENCE TO RELATED APPLICATIONS

This application is a United States national stage application of PCT Patent Application No. US2011/046045, filed Jul. 30, 2011, which claims priority to U.S. Provisional application No. 61/378,169, filed Aug. 30, 2010. The contents of each priority application are incorporated herein by reference to the extent consistent with the disclosure.

BACKGROUND

Turbomachine shafts generally rotate at high speeds and, thus, typically vibrate during operation according to a characteristic stiffness, mass, and eccentricity. These characteristics, along with applied radial and axial loads, determine the frequency-amplitude relationship of the vibrations. It is usually desirable to determine the characteristics of the shaft and then to monitor the shaft rotational speed to ensure that the shaft is not operating at or near a critical speed or a harmonic thereof where the shaft resonates and therefore vibrates at maximum amplitude. This can create challenges if, for example, a desired operating load on the turbomachine corresponds with the shaft rotating at or near the critical speed or a harmonic thereof. Additional challenges can also be encountered in applications where the shaft is operated at speeds above the critical speed or harmonics thereof, as the shaft must traverse the critical speed and the harmonics thereof, where applicable, to reach the operating speed. To attenuate vibration, conventional dampers, such as squeeze film dampers, are often provided to damp the shaft vibration and thereby alter the critical speed of the shaft and/or decrease the amplitude of the associated vibrations. Conventional dampers are generally suitable for many applications; however, they often include drawbacks such as friction-related efficiency losses and lubrication needs.

Furthermore, in shafts supported by one or more magnetic bearings, the magnetic bearings may fail to levitate the shaft, thereby dropping the shaft, for example, during an emergency shutdown. Turbomachines are thus typically provided with auxiliary or "catcher" bearings, which catch the shaft and allow it to coast down to a stop, substantially preventing damage to the turbomachine. Dynamic forces, which may be both axially and radially directed, however, are often applied to the various components of the turbomachine during the drop and subsequent coast-down. Furthermore, if, prior to the drop, the shaft is operating above the critical speed and/or a harmonic thereof, the rotational velocity of the shaft coasting down on the auxiliary bearings may slowly approach and traverse the critical speed and/or harmonics thereof, and thus the shaft will vibrate at or near the resonance frequency, or a harmonic thereof, for an extended period of time as the shaft slowly decelerates to, through, and away from the critical speed and/or the harmonics thereof.

What is needed, therefore, is an apparatus and method that provides frictionless damping and/or increased braking speed.

SUMMARY

Embodiments of the disclosure may provide an exemplary apparatus for supporting a shaft of a turbomachine. The apparatus may include a magnetic bearing to support the shaft during a normal operation of the turbomachine, and an auxiliary bearing to support the shaft during a drop event. The apparatus may also include a disk coupled to the shaft and including a substantially non-ferrous, conductive material. The apparatus may further include a magnetic assembly disposed proximal the disk, the magnetic assembly configured to magnetically engage the disk to damp vibrations during the drop event, to apply a circumferential braking force on the disk during the drop event, or both.

Embodiments of the disclosure may further provide an exemplary method for reducing vibration in a rotating shaft. The method may include levitating the shaft with a magnetic bearing and de-levitating the shaft such that the shaft drops a distance. The method may also include catching the de-levitated shaft with auxiliary bearings and magnetically engaging a non-ferrous, conductive disk when the shaft is de-levitated, the disk being disposed around and coupled to the shaft, such that vibrations resulting from de-levitating the shaft are damped.

Embodiments of the disclosure may also provide an exemplary turbomachine. The exemplary turbomachine may include a shaft and one or more magnetic bearings disposed at least partially around the shaft and configured to support the shaft during normal operation. The turbomachine may also include one or more auxiliary bearings disposed at least partially around the shaft and configured to support the shaft during a drop event. The turbomachine may further include a disk including a non-ferrous conductive material, a radial inside coupled to the shaft, and a radial outside. The turbomachine may also include a magnetic assembly having at least two magnets disposed about 180 degrees apart around the disk, the magnets configured to engage the disk at least during the drop event.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
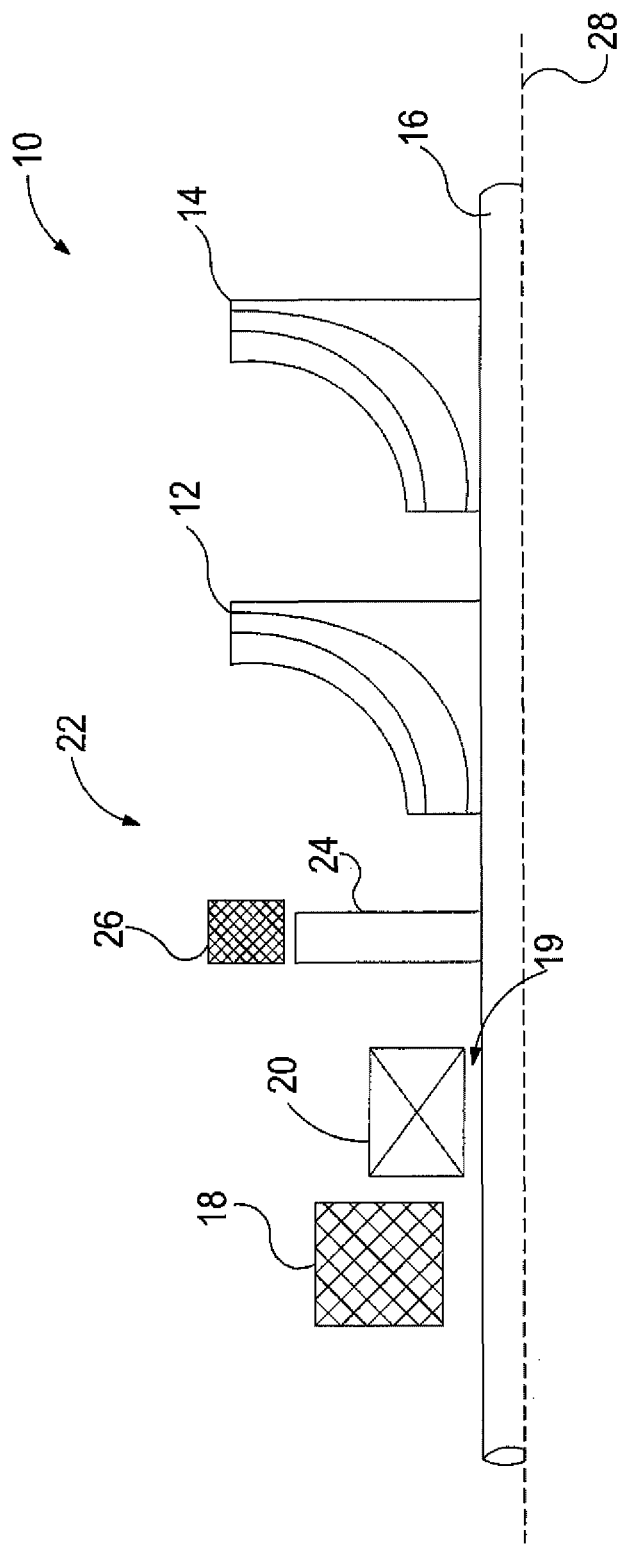
FIG. 1 illustrates a partial schematic view of an exemplary turbomachine, according to one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a partial schematic view of an exemplary turbomachine 10. In various exemplary embodiments, the turbomachine 10 may be a turbine, pump, separator, any type of compressor, a combination thereof, or any other type of rotating machinery. For descriptive purposes only, the turbomachine 10 is illustrated as a centrifugal compressor and includes one or more impellers (two are shown: 12, 14) disposed on a shaft 16, which rotates about an axis 28. The shaft 16 is supported by one or more bearings, which, in an exemplary embodiment, may be or include an active magnetic bearing 18. It will be appreciated that additional bearings, for example, a second magnetic bearing (not shown) disposed on the right side of the impeller 14, between impellers 12 and 14, or elsewhere, may be included without departing from the scope of this disclosure. The shaft 16 may be supported by the magnetic bearing 18 during normal operation; however, during an emergency such as a turbine trip, a power outage, or if the magnetic bearing 18 fails for any reason, the magnetic bearing 18 may fail to levitate the shaft 16, causing a drop event. One or more auxiliary bearings, e.g., auxiliary bearing 20, may be provided to support the shaft 16 during such a drop event so that the shaft 16 can decelerate or "coast down" to a stop, thereby reducing or avoiding damage to the turbomachine 10. Since the magnetic bearing 18 supports the shaft 16 during normal operation, a gap 19 may exist between the auxiliary bearing 20 and the shaft 16, as shown, which the shaft 16 traverses during a drop event. Since the shaft 16 is loosely fit in the auxiliary bearing 20 to provide the gap 19, the rotation of the shaft 16 during coast down may apply cyclic loading on the auxiliary bearing 20 as the shaft 16 shifts therein.

The turbomachine 10 may also include an eddy current damper 22. The eddy current damper 22 generally includes a disk 24 and a magnetic assembly 26. The disk 24 may be coupled to the shaft 16 using any coupling devices and/or bearings. Accordingly, in various exemplary embodiments, the disk 24 may or may not rotate with the rotating shaft 16. The disk 24 may be made of a substantially non-ferrous, conductive material such as aluminum, copper, non-magnetic stainless steel, titanium, combinations thereof, alloys thereof, or like materials.

The magnetic assembly 26 may be or include one or more magnets and may be configured to magnetically engage the disk 24. For example, the magnet(s) of the magnetic assembly 26 may be permanent magnets. When it is desired to magnetically engage the disk 24, the magnet(s) may be brought into close proximity with the disk 24 such that eddy currents are produced in the disk 24 to resist motion of the shaft 16, as will be described in greater detail below. Similarly, the magnet(s) of the magnetic assembly 26 may be electromagnets; thus, when it is desired to magnetically engage the disk 24, electric current may be provided to the electromagnets such that the electromagnets magnetically engage the disk 24.

Figure 2:
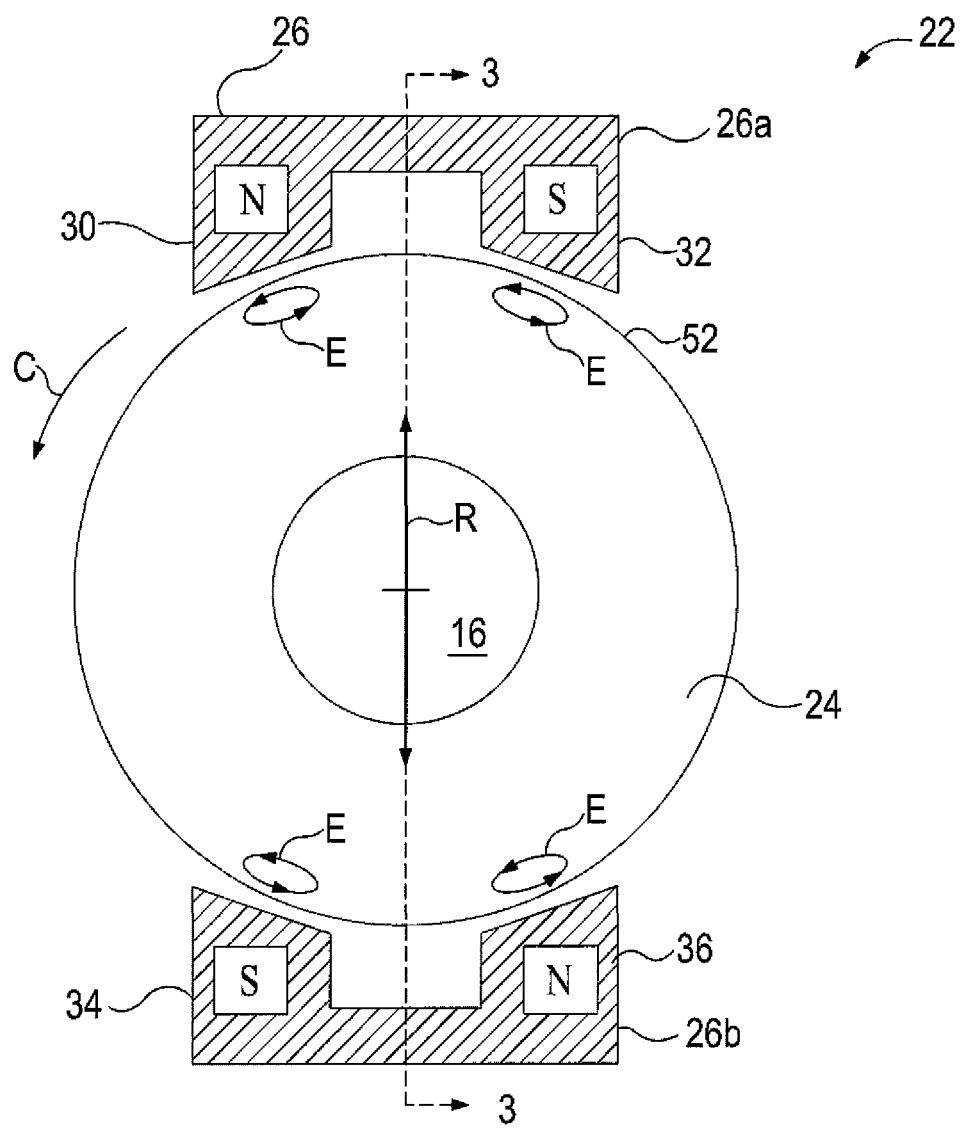
FIG. 2 illustrates an axial end view of an exemplary eddy current damper, according to one or more aspects of the disclosure.

FIG. 2 illustrates an axial view of an exemplary embodiment of the eddy current damper 22, showing the disk 24 of the eddy current damper 22 coupled to the shaft 16. The magnetic assembly 26 includes one or more magnets (two are shown: 26a, 26b), which may extend entirely or partially around the disk 24. In at least one exemplary embodiment, the magnets 26a,b are positioned substantially opposite each other around the disk 24. For example, the magnets 26a,b may be offset by approximately 180 degrees from each other around the periphery of the disk 24. Additionally, poles 30, 32 of magnet 26a may be reversed compared to poles 34,36 of the magnet 26b, as shown. As such, the magnetic fields produced by the magnets 26a,b may be directionally opposed with respect to each other. It will be appreciated, however, that the illustration of the two magnets 26a,b is merely exemplary and additional or fewer magnets may be incorporated without departing from the scope of this disclosure.

The magnets 26a,b may be disposed proximal the disk 24, i.e., close enough to magnetically engage the disk 24 along a radial outside 52 thereof. In an exemplary embodiment, the magnets 26a,b may be electromagnets, which may be powered using any suitable electric circuit (not shown). Alternatively, the magnets 26a,b may be permanent magnets, which may be moved radially and/or axially toward and/or away from the disk 24, for example, using a servomotor, a solenoid, a manual mechanical linkage, or the like to control the magnetic engagement of the disk 24. In various exemplary embodiments, the position and/or current provided to the magnets 26a,b may be controlled by a feedback control loop and any electric circuits and/or mechanical linkages (none shown).

Figure 3A:
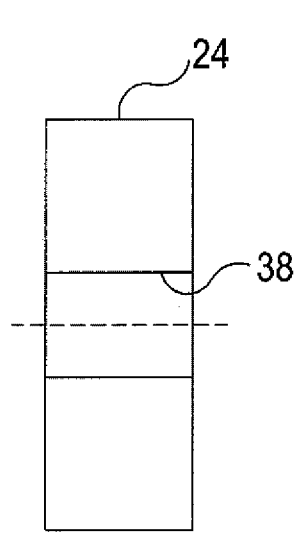
FIG. 3a illustrates a partial, side cross-sectional view of the exemplary damper along line 3-3 of FIG. 2.
Figure 3B:
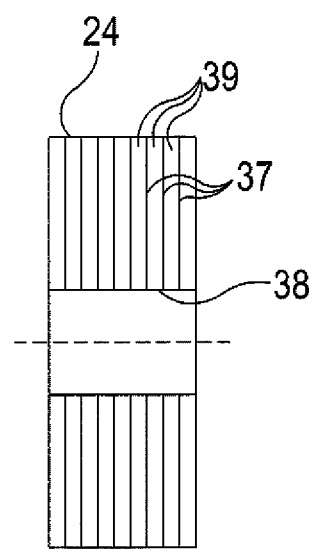
FIG. 3b illustrates a partial, side cross-sectional view of another embodiment of the exemplary damper along line 3-3 of FIG. 2.

FIGS. 3a and 3b illustrate two exemplary embodiments of the disk 24 in cross-section along line 3-3 of FIG. 2, omitting the magnetic assembly 26 for simplicity of illustration. FIG. 3a illustrates a substantially uniformly-constructed disk 24 made of non-ferrous, conductive material substantially throughout, except for a central bore 38 formed axially there-through for receiving the shaft 16 (FIGS. 1 and 2). FIG. 3*b* illustrates another exemplary embodiment of the disk 24, in which the disk 24 is constructed of alternating layers of insulation 37, such as rubber, plastic, or another non-conductive material, and laminated non-ferrous metallic layers 39, which are disposed around the central bore 38. In an exemplary embodiment, each layer of insulation 37 may be disposed between two laminated metallic layers 39. Although not shown, in various exemplary embodiments, one, some, or all of the layers of insulation 37 may include multiple layers of insulation. Furthermore, the sequence of layers of insulation 37 and laminated metallic layers 39 may not be alternating, and several laminated layers 39 may be disposed between layers of insulation 37, or vice versa.

Figure 4:
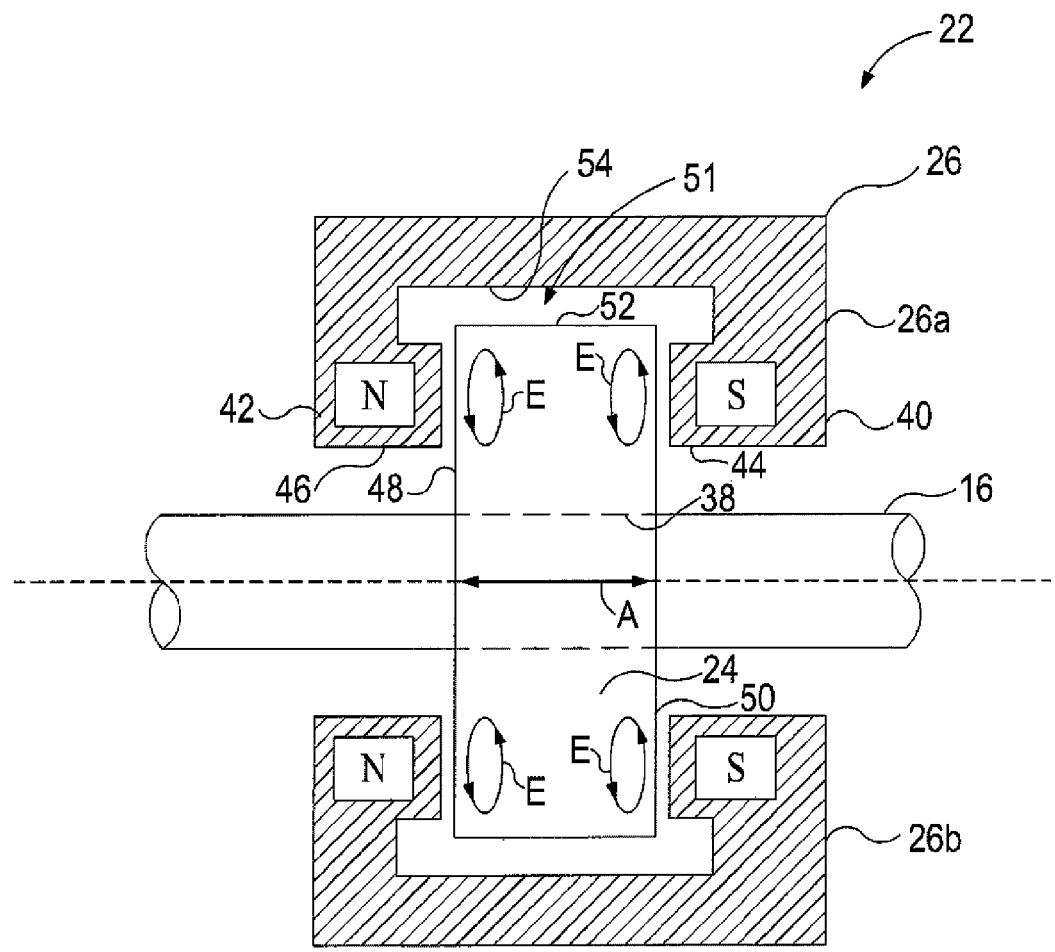
FIG. 4 illustrates a side cross-sectional view of another exemplary eddy current damper, according to one or more aspects of the disclosure.

FIG. 4 illustrates a side cross-sectional view of another exemplary embodiment of the eddy current damper 22. As shown, the eddy current damper 22 includes the disk 24, with the central bore 38 receiving the shaft 16 substantially as described above. The eddy current damper 22 also includes the magnetic assembly 26, which may include the magnets 26*a,b*. The magnets 26*a,b* may include radial extensions 40, 42, which may extend radially-inward toward the shaft 16. The magnets 26*a,b* may also include disk engaging sections 44, 46 that are coupled to the radial extensions 40, 42, respectively, and extend axially therefrom toward the disk 24. The disk 24 includes first and second axial ends 48, 50, which may be substantially flat in profile, as shown, or may include grooves adapted to receive the disk engaging sections 44, 46 or the like. The shaft 16 may be supported by the magnetic bearing 18 and/or the auxiliary bearing 20 such that a clearance 51 exists between a radial outside 52 of the disk 24 a radial inside 54 of the magnetic assembly 26, as shown.

Figure 5:
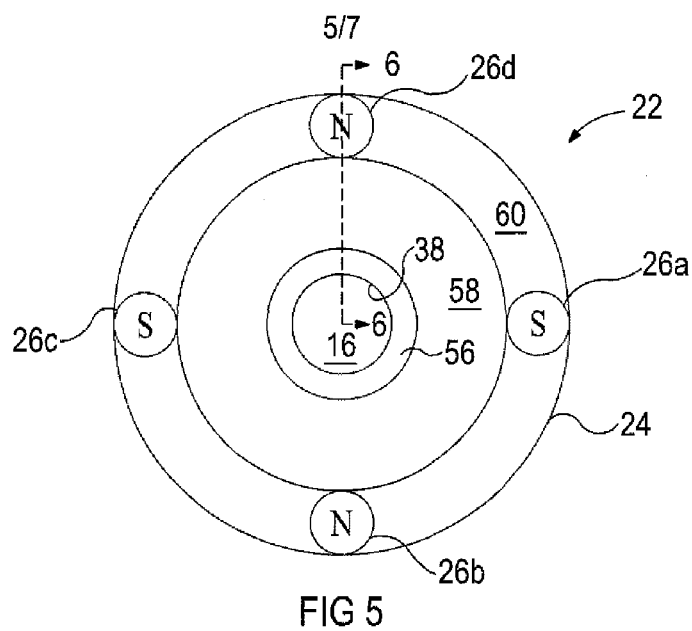
FIG. 5 illustrates an axial end view of another exemplary eddy current damper, according to one or more aspects of the disclosure.

FIG. 5 illustrates an axial view of another exemplary embodiment of the eddy current damper 22. As described above with reference to FIG. 4, the eddy current damper 22 may include the disk 24 with the central bore 38 sized to receive the shaft 16. The disk 24, however, may also include a hub 56, a connecting section 58, and an outer ring 60. The hub 56 may define the central bore 38 and may be coupled to the shaft 16 by any suitable coupling device and/or method. The connecting section 58 may extend radially from the hub 56 and may be coupled thereto or formed integrally therewith. The outer ring 60 may be disposed around the outside of the connecting section 58 and may be coupled thereto or formed integrally therewith.

The eddy current damper 22 may further include the magnetic assembly 26, which, in an exemplary embodiment, is shown as four magnets 26*a-d*; however, in other embodiments the illustrated four magnets 26*a-d* may be four poles of two magnets. The magnets 26*a-d* may be radially-aligned with the outer ring 60, as may better be appreciated from FIG. 6, described below, and may be positioned at predetermined intervals around the shaft 16. For example, the magnets 26*a-d* may be positioned at approximately 90 degree intervals around the disk 24, although other equal or unequal intervals may instead be chosen. Furthermore, the polarity of the magnets 26*a-d* may alternate proceeding around the shaft 16, such that, for example, the magnet 26*a* has a reverse polarity as the magnet 26*b*, which in turn has a reverse polarity as magnet 26*c*, and so on.

Figure 6:
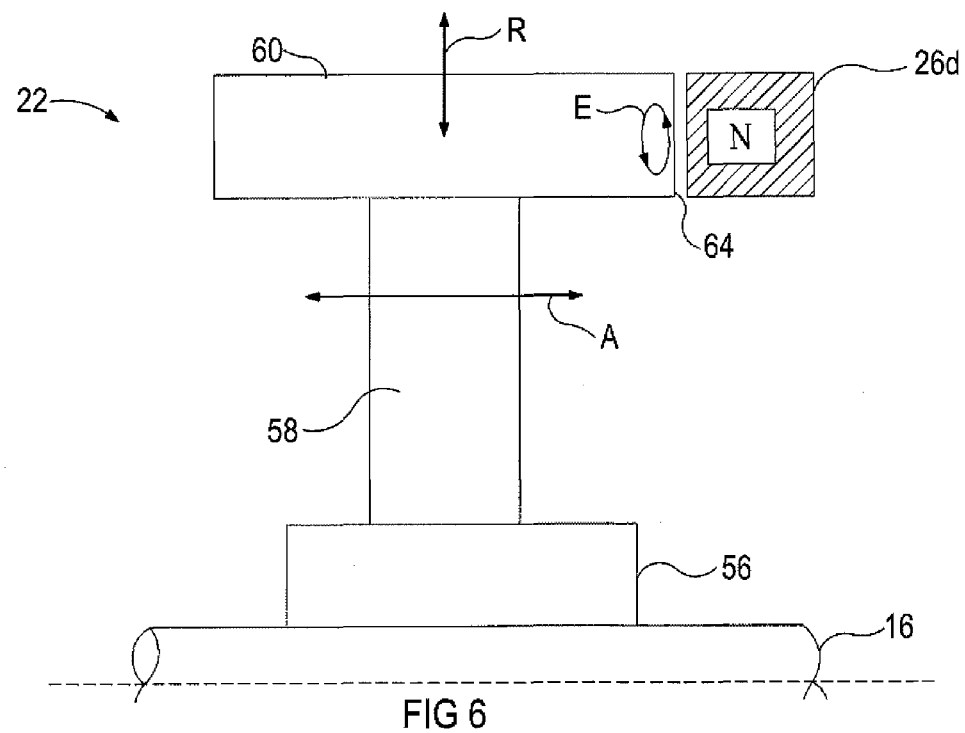
FIG. 6 illustrates a side cross-sectional view of the exemplary eddy current damper of FIG. 5 along line 6-6.

FIG. 6 illustrates a side cross-sectional view of the exemplary eddy current damper 22 of FIG. 5 taken along section line 6-6. As described above with reference to FIG. 5, the eddy current damper 22 may include the hub 56 coupled to the shaft 16, the connecting section 58 extending radially from the hub 56, and the outer ring 60 coupled to the connecting section 58. The outer ring 60 may be orthogonally or transversely oriented with respect to the radially-extending connecting section 58, such that the outer ring 60 provides a relatively large radial surface area. As also described above, the magnets 26*a-d* (only 26*d* is shown in FIG. 6) may be aligned with and magnetically engage at least one axial end 64 of the outer ring 60.

In an exemplary embodiment, the hub 56, connecting section 58, and outer ring 60 may together provide a generally annular disk-shaped structure, which may, for example, also be used as a balance piston. One with skill in the art will appreciate that a balance piston may be used to counteract any axial thrust forces on the turbomachine 10. Accordingly, the balance piston may be in communication with a source of pressurized gas (not shown) to balance thrust forces applied by pressure differentials along the axis 28 (FIG. 1) of the turbomachine 10. Furthermore, the generally annular disk-shaped structure may provide a relatively large mass, such that the generally annular disk-shaped structure is effective as a heat sink for heat generated by the magnetic engagement between the magnetic assembly 26 and the outer ring 60, as described in greater detail below.

Referring now to FIGS. 2-6, exemplary operation of the eddy current damper 22 may be appreciated. Since the disk 24 is made at least partially of non-ferrous conductive material, the motion of the disk 24 in the magnetic field produced by the magnetic assembly 26 creates eddy currents E in the disk 24. When the shaft 16 rotates, there are generally three directions in which the disk 24 may move: the disk 24 may vibrate radially, for example, along arrow R of FIGS. 2 and 6, and/or any other radial direction; the disk 24 may vibrate axially, along arrow A of FIGS. 4 and 6; and/or the disk 24 may rotate along arrow C of FIG. 2. When the magnetic assembly 26 engages the disk 24, any of these movements create eddy currents E in a plane normal to the movement. The eddy currents E create a second magnetic field, which opposes the movement of the disk 24 in any direction. The magnitude of such opposing force is proportional to the velocity of the movement of the disk 24. Accordingly, when the eddy currents E are produced in reaction to radial or axial vibration, the resistive forces created by the eddy currents E reduces shaft 16 motion through the dissipation of kinetic energy.

Furthermore, such damping can be selective or continuous. For example, if the damping is desired to be selective, the eddy current damper 22 may be turned on or off as necessary. When the eddy current damper 22 is turned on, the magnetic assembly 26 engages the disk 24, i.e., any permanent magnets of the magnetic assembly 26 are brought into close proximity with the disk 24, and any electromagnets of the magnetic assembly 26 are provided electric current. When the eddy current damper 22 is turned off, the disk 24 is generally free from magnetic engagement with the magnetic assembly 26, i.e., any permanent magnets of the magnetic assembly 26 are moved away from the disk 24, and current is cut off from any electromagnets of the magnetic assembly 26. In an exemplary embodiment, the eddy current damper 22 may be turned on when the shaft 16 is proximal to and/or traverses a critical speed, reducing the amplitude of the vibrations during acceleration or deceleration of the shaft 16. Since circumferential motion along arrow C of the disk 24, and thus the shaft 16, is opposed by the eddy current damper 22, the eddy current damper 22 may incur an efficiency loss during the rotation of the shaft 16; therefore, it may be desirable to turn the eddy current damper 22 off when shaft 16 vibration is within tolerable ranges, thereby avoiding efficiency losses.

Another example where selective damping using the eddy current damper 22 may be employed is during a drop event, as described above with reference to FIG. 1. During a drop event, the auxiliary bearing 20 (FIG. 1) may rapidly accelerate from generally stationary to the speed of the shaft 16. The force required to accelerate the auxiliary bearing 20 may provide a dynamic load on the shaft 16. Additionally, the thrust-compensating forces supplied by the magnetic bearing 18 during normal operation may be removed, leaving a net axial thrust on the auxiliary bearing 20. Furthermore, the shaft 16 rotating in the loose-fitting auxiliary bearing 20, as described above with reference to FIG. 1, may apply a cyclic or otherwise varying load on the shaft 16 while the shaft 16 rotates on the auxiliary bearing 20. Any or all of these forces may result in a period of intense shaft 16 radial and/or axial vibration after a drop event. To attenuate the vibrations, the eddy current damper 22 may be turned on just subsequent to the drop, to increase the damping on the shaft 16 during the coast-down. Furthermore, the eddy current damper 22 may be turned on just prior to the drop, thereby transferring at least some of the force of the dropping shaft 16 to the support structure (not shown) of the eddy current damper 22, allowing the eddy current damper 22 to act as a shock-absorber for the auxiliary bearing 20.

During a drop event, the drag force applied by the eddy current damper 22 on the disk 24 that resists circumferential motion may be harnessed to provide a magnetic braking device. As noted above, the circumferential motion of the disk 24 along arrow C in the magnetic field creates eddy currents E that induce a second magnetic field, thereby resisting the circumferential motion. In such exemplary operation, this drag force is employed to more rapidly decrease the rotational velocity of the coasting shaft 16, thereby abbreviating the coast-down time. This may reduce the number of cycles of dynamic loading applied on the shaft 16, thereby reducing wear on the auxiliary bearing 20 and/or the shaft 16.

Moreover, with specific reference to FIG. 2, the eddy current damper 22 illustrated therein may be well-suited for controlling radial vibrations, for example, along arrow R, as the magnetic assembly 26 is configured to engage the radial outside of the disk 24. In comparison, the eddy current damper 22 illustrated in FIG. 4 may be well-suited to control axial vibrations along arrow A, since the magnetic assembly 26 thereof is configured to engage the axial ends 48, 50 of the disk 24. Further, the eddy current damper 22 illustrated in FIG. 6 may be well-suited to control vibrations in the radial direction, for example, along arrow R, and/or the axial direction along arrow A. As explanation, the orientation of the magnetic assembly 26 may be determined by the degree of freedom in the shaft 16 that requires the greatest amount of damping (i.e., energy dissipation). For example, a greater amount of energy dissipation may occur when the motion is normal to the surface of a magnet. Thus, the eddy current damper 22 illustrated in FIG. 2 efficiently reduces radial vibration, while the eddy current damper 22 illustrated in FIG. 4 efficiently reduces axial vibration, and the eddy current damper 22 illustrated in FIG. 6 may be configured to efficiently reduce both.

In various exemplary embodiments, any of the eddy current dampers 22 of FIGS. 1, 2, and 4-6 may remain on during normal operation. The induced eddy currents E, however, resist the circumferential movement of the disk 24, and thus may incur drag-type efficiency losses in the shaft 16 rotation. To minimize this inefficiency, the eddy currents E may be minimized by employing the laminated disk 24 shown in and described above with reference to FIG. 3b. In contrast, where large movement-opposing forces are desired, such as in the described selective damping or in magnetic braking, the substantially-uniform disk 24 of FIG. 3a may be more suitable.

Additionally, the eddy currents E produce heat. This too represents inefficiency and may also damage components of the turbomachine 10. To minimize such heat production, the laminated disk 24 of FIG. 3b may be employed to minimize the eddy current E. Alternatively or additionally, the eddy current damper 22 including the balance piston, as shown in FIG. 6, may be employed. Since the balance piston provides a relatively large mass, it may act as a heat sink to dissipate the heat produced by the eddy currents E.

Figure 7:
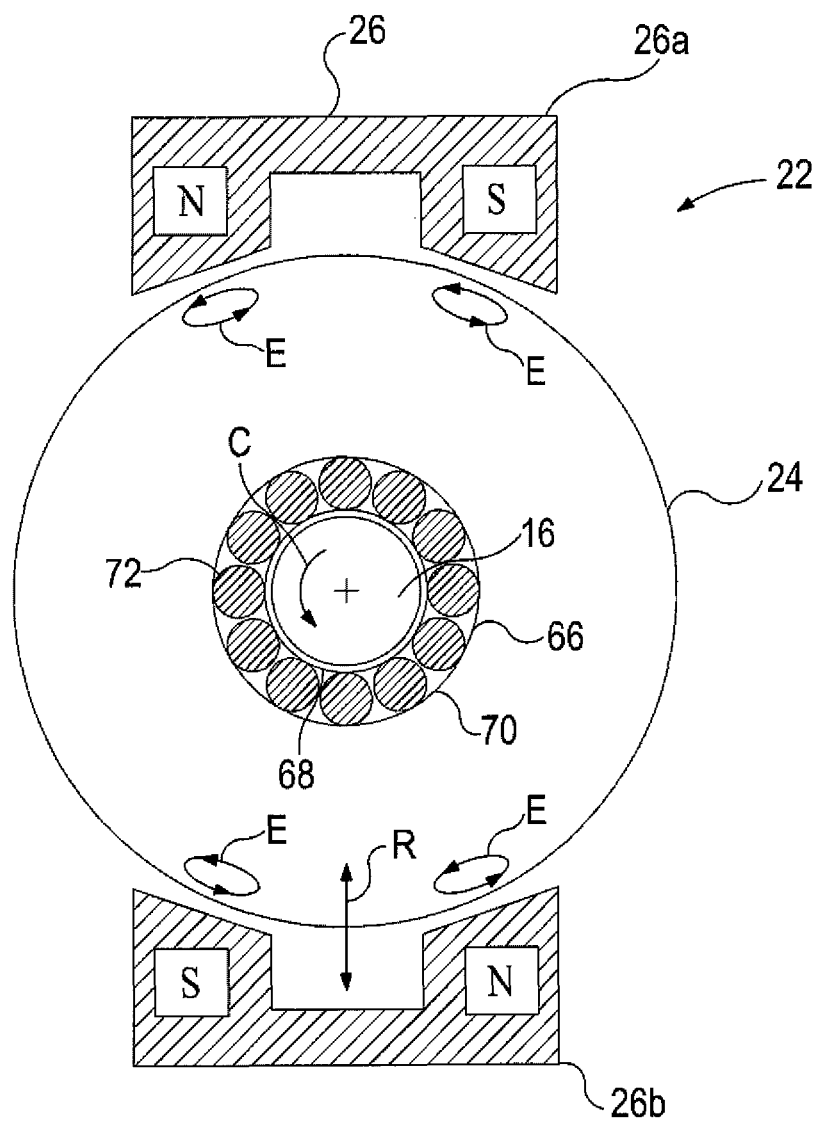
FIG. 7 illustrates an axial end view of another exemplary eddy current damper, according to one or more aspects of the disclosure.

FIG. 7 illustrates another exemplary eddy current damper 22, which includes a bearing 66 interposed between the disk 24 and the shaft 16. The bearing 66 may include inner and outer races 68, 70, with the inner race 68 attached to the shaft 16 and rotatable therewith, and the outer race 70 attached to the disk 24. In an exemplary embodiment, between the inner and outer races 68, 70, there may be disposed a plurality of rolling elements 72, for example, ball bearings. It will be appreciated, however, that other types of rolling elements 72, and indeed other types of bearings 66, may be employed without departing from the scope of this disclosure.

In exemplary operation of the eddy current damper 22 including the bearing 66, the shaft 16 rotates, but the rotation of the shaft 16 is generally de-coupled from the disk 24 by the bearing 66. When the rotation is de-coupled, the shaft 16 rotating generally does not directly cause the disk 24 to rotate, except to the extent the bearing 66 applies a friction force on the disk 24. Accordingly, the disk 24 may be substantially free to rotate from other forces or devices or may remain at substantially zero rotational velocity. As such, the magnets 26a,b of the magnetic assembly 26 generally may not create eddy currents in the disk 24 based solely on the rotational movement of the shaft 16 along arrow C. However, as explained above, the characteristics of the shaft 16 and/or the turbomachine 10 (FIG. 1), or dynamic forces from a drop event, may cause the rotating shaft 16, and thus the disk 24, to vibrate in the radial direction, for example, as illustrated by arrow R.

Although not shown, it will be appreciated that vibration in the axial direction may also be caused by cyclic and/or dynamic axial thrust forces on the shaft 16, as described above. Accordingly, the axial and radial movement caused by the vibration moves the disk 24 within the magnetic field produced by the magnetic assembly 26, thereby generating the eddy currents E. As described above, the eddy currents E provide a force on the disk 24 opposing the direction of motion proportional to the velocity of the disk 24 movement, thereby damping the vibration of the disk 24 and the shaft 16.

Figure 8:
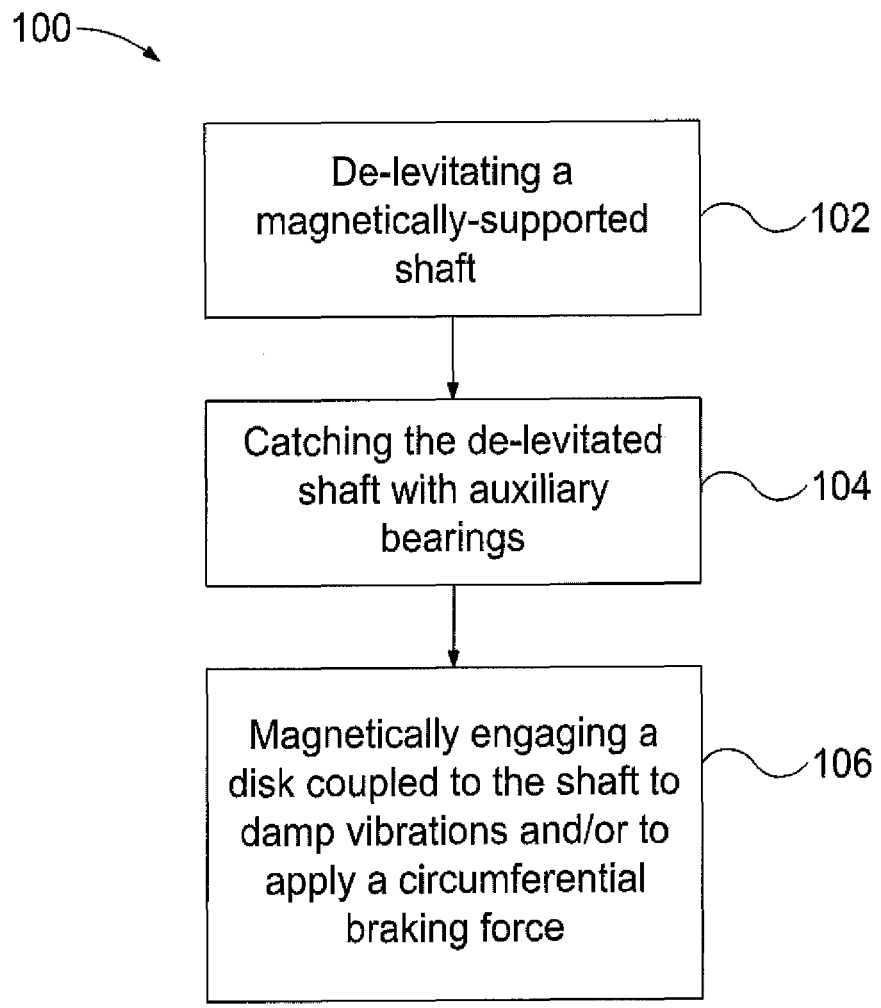
FIG. 8 illustrates a flow chart of an exemplary method for reducing vibration in a magnetically-supported shaft, according to one or more aspects of the disclosure.

FIG. 8 illustrates a flowchart of an exemplary method 100 for reducing vibration in a magnetically-supported shaft. The method 100 may proceed by operation of the eddy current damper 22 and the turbomachine 10 described above and may thus be best understood with reference thereto. The method 100 may include de-levitating the shaft such that the shaft drops a distance, as at 102. This may occur in a shaft that is supported by one or more magnetic bearings, as described above with reference to FIG. 1. The de-levitation may be the result of a failure of the magnetic bearings, which may occur for a variety of different reasons. Once the de-levitation occurs, the method 100 may include catching the de-levitated shaft with one or more auxiliary bearings, as at 104. The auxiliary bearings may constrain the motion of the shaft after the de-levitation. However, while rotating in the auxiliary bearings, the shaft may be subject to cyclic and/or dynamic loading as it coasts-down on the auxiliary bearings. Accordingly, the method 100 may include magnetically engaging a non-ferrous, conductive disk disposed around and coupled to the shaft to induce eddy currents, as at 106, for example, with a magnetic assembly. As also indicated at 106, inducing the eddy currents may damp vibrations resulting from the de-levitation of the shaft by inducing a magnetic field that opposes the magnetic field of the magnets, thereby opposing motion in the disk, and thus the shaft.

The vibrations in the shaft may be axially and/or radially directed. Accordingly, in an exemplary embodiment, magnetically engaging the disk may include damping at least one of axial and radial vibrations in the de-levitated shaft. As such, magnetically engaging the disk may generally include magnetically engaging at least one of a radial outside of the disk and an axial end of the disk, to provide the magnetic field suitable for inducing the desired eddy currents.

In some exemplary embodiments, it may be desirable to avoid inducing eddy currents by the rotation of the disk in the magnetic field. Accordingly, the method 100 may include decoupling the rotation of the shaft from the disk, for example, using a bearing interposed between the shaft and the disk, as described above with reference to FIG. 7. Accordingly, eddy currents may be produced in the disk in response to shaft vibration, but substantially avoided in response to circumferential movement of the shaft, since such motion may generally not be translated to the disk. In other exemplary embodiments, the disk may be directly coupled to the shaft, such that the disk rotates along with the shaft. In such a situation, eddy currents are produced which resist the rotation of the disk, and thus the shaft, when the magnets magnetically engage the disk. Such embodiments may provide a magnetic braking device, for example, to hasten the coast-down of the shaft after a drop.

Furthermore, the method 100 may include magnetically engaging the disk prior to de-levitating the shaft. For example, magnetically engaging the disk may include magnetically engaging the disk during normal operation of the shaft, during start up, during shut down, or any combination thereof. In such cases, it may be desirable to induce smaller eddy currents, to avoid substantial drag losses and/or to avoid creating large amounts of heat. Accordingly, the disk may include layers of insulation interposed between layers of laminated non-ferrous disks, as shown in and described above with reference to FIG. 3b. Additionally, or alternatively, it may be desirable to minimize rotation of the disk on the shaft; accordingly, a bearing may be provided between the shaft and the disk to substantially cut off rotational translation of the disk on the shaft.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. An apparatus for supporting a shaft of a turbomachine, comprising:
   a magnetic bearing to support the shaft during a normal operation of the turbomachine;
   an auxiliary bearing to support the shaft during a drop event;
   a disk coupled to the shaft and comprising a substantially non-ferrous, conductive material, wherein the disk further comprises a plurality of metallic layers and a plurality of insulation layers, at least one of the plurality of metallic layers being disposed between at least two of the plurality of insulation layers; and
   a magnetic assembly disposed proximal the disk, the magnetic assembly configured to magnetically engage the disk to damp vibrations during the drop event, to apply a circumferential braking force on the disk during the drop event, or both.

2. The apparatus of claim 1, wherein the magnetic assembly magnetically engages the disk when a shaft rotation speed is proximate a critical speed of the shaft and is magnetically disengaged from the disk at other times.

3. The apparatus of claim 1, wherein the magnetic assembly comprises first and second magnets disposed about 180 degrees apart around the shaft.

4. The apparatus of claim 3, wherein the first and second magnets engage a radial outside of the disk.

5. The apparatus of claim 3, wherein the first and second magnets engage at least one axial end of the disk.

6. The apparatus of claim 1, wherein the disk comprises a balance piston including:
   a hub coupled to the shaft;
   a connecting section extending radially from the hub; and
   an outer ring extending axially with respect to the shaft, coupled to the connecting section, and having an axial end, wherein the magnetic assembly engages the axial end of the balance piston.

7. The apparatus of claim 1, further comprising a bearing disposed radially between the disk and the shaft, the bearing configured to substantially de-couple rotation of the shaft from rotation of the disk.

8. The apparatus of claim 7, wherein the bearing comprises:
   an inner race coupled to the shaft and rotatable therewith;
   an outer race coupled to the disk; and
   a plurality of roller elements disposed between the inner and outer races.

9. A method for reducing vibration in a rotating shaft, comprising:
   levitating the shaft with a magnetic bearing;
   de-levitating the shaft such that the shaft drops a distance;
   catching the de-levitated shaft with at least one auxiliary bearing; and
   magnetically engaging a non-ferrous, conductive disk prior to de-levitating the shaft and when the shaft is de-levitated, the disk being disposed around and coupled to the shaft, such that vibrations resulting from de-levitating the shaft are damped, wherein the disk comprises layers of insulation and metallic layers.

10. The method of claim 9, wherein magnetically engaging the disk comprises magnetically engaging a radial outside of the disk to damp at least one of axial and radial vibrations resulting from de-levitating the shaft.

11. The method of claim 9, wherein magnetically engaging the disk comprises magnetically engaging at least one axial end of the disk to damp at least one of axial and radial vibrations resulting from de-levitating the shaft.

12. The method of claim 9, further comprising de-coupling a rotation of the shaft from the disk, wherein magnetically engaging the disk further comprises magnetically engaging the disk during normal operation of the shaft.

13. The method of claim 9, further comprising:
   magnetically engaging the disk during normal operation of the shaft; and
   conducting heat with the disk, wherein the disk provides at least part of a balance piston configured to balance axial thrust on the shaft.

14. A turbomachine, comprising:
a shaft;
one or more magnetic bearings disposed at least partially around the shaft and configured to support the shaft during normal operation;
one or more auxiliary bearings disposed at least partially around the shaft and configured to support the shaft at least during a drop event;
a disk comprising a non-ferrous conductive material, a radial inside coupled to the shaft, and a radial outside, wherein the disk is rotatable with the shaft and further comprises a plurality of laminated metallic layers and a plurality of insulation layers, each of the plurality of insulation layers being disposed between at least two of the plurality of laminated metallic layers; and
a magnetic assembly comprising at least two magnets disposed about 180 degrees apart around the disk, the magnets configured to engage the disk at least during the drop event.

15. The turbomachine of claim 14, wherein the disk comprises a balance piston including a hub coupled to the shaft, a connecting section coupled to the hub and extending radially outward therefrom, and an outer ring coupled to the connecting section, disposed transversely in relation thereto, and providing an axial end of the disk, wherein the magnetic assembly engages the axial end of the disk.

16. The turbomachine of claim 14, wherein the magnetic assembly is configured to engage at least one of the radial outside of the disk and an axial end of the disk.

* * * * *